Fig. 3.

RM = MEMORY REGISTER
RT = ACCUMULATOR REGISTER

| COMMON OPERATIONS | CYCLE E2 | | | CYCLE E4 | | |
| --- | --- | --- | --- | --- | --- | --- |
| | t0 | t1 | t2 | t0 | t1 | t2 |
| | 0 → RM ADDRESS | | | | | |
| ECH | | READ | RM⊕RT→RT | | RT⊕RM→RM | RM⊕RT→RT WRITE |

MEMORY REGISTER     ACCUMULATOR REGISTER

| $y$ | $x$ |

Inventors
SERGE DELAIGUE
RENÉ RAUCHE

By Charles T. Johnson
Attorney

United States Patent Office 3,398,402
Patented Aug. 20, 1968

3,398,402
SIMPLIFIED DATA-PROCESSING SYSTEM
Serge Delaigue, Chaville, and Rene Rauche, Orly, France, assignors to International Standard Electric Corporation, New York, N.Y., a corporation of Delaware
Filed Sept. 27, 1965, Ser. No. 490,546
Claims priority, application France, Oct. 2, 1964, 990,131, Patent 1,421,389
3 Claims. (Cl. 340—172.5)

ABSTRACT OF THE DISCLOSURE

A data switching unit exchanges information between two bistable reigsters. Two "exclusive OR" operators are used in the exchange which takes place in three stages:

(a) The first operator makes the "sum modulo two" of the operands stored in the two registers so as to record the result of the operation in one of them;

(b) The second operator repeats the same operation so as to record the result in the other register;

(c) The first operator repeats once more the same operation so as to record the result in the first register. During these successive transformations some of the terms get eliminated; so that the operand, stored initially in the first register happens to be finally in the second register, and vice versa.

---

This invention relates generally to data processing and more particularly to a method and apparatus for the interchange or transfer of binary coded data between two data registers.

Such a transfer is often desirable in the operation of a computing machine. Such a machine might include a memory, an address selector, a program counter, a memory register, an instruction register, an alloter and operators. In such a machine a first stage, under control of the program counter, an instruction is called and is transferred in succession to the memory register, then to the instruction register. The instructions includes useful information as to the operand and the nature of the operation to be made. In a second stage, under control of the instruction register, the operand is called and transferred to the memory register. An alloter will successively set into service, under control of the instruction register, operators which are going to perform elementary operations so as to obtain the required result. The alloter steps the program counter forward by one step in order to prepare the call of the next instruction. In case it is necessary to operate on two operands, each one is called upon in succession by means of an appropriate instruction and two registers are provided to store them. The memory register already mentioned and an additional accumulation register are used for this purpose. The memory register, the accumulator register, the instruction register and the program counter are made up of simple bistable registers. The various operations of the system, such as the call of the instruction, the execution of the operations (restoring to zero, transfer of data between reigsters, stepping the program counter, etc.) are all accomplished by a small number of standardized operators which are set into service by the allotter at the opportune time.

The invention considered here concerns the exchanging of information between a memory cell and a bistable register. In order to realize such an exchange of information, it is possible to resort to an evident prior art solution illustrated by the diagram in FIGURE 1. A cell of the memory 2 is materialized by the full set of magnetic cores 4 placed on a horizontal line. The choice of a cell is made by the address selector 6 and the associated decoder 8. It is necessary to transfer into the accumulator register 10 the character stored in the memory cell 2, and vice versa.

With that purpose, the reading is made of this cell by storing its contents in the memory register 12. The characters stored in registers 10 and 12 are transferred, respectively, into the intermediary registers 14 and 16, through links 18 and 20; and then transferred to registers 10 and 12 through the cross-links 22 and 24. A storing operation is then effected by transferring the new contents of register 12 into the memory cell. The exchange is thus realized. Such a process is simple, but costly, since it requires two intermediary registers. It would not be suitable for a simplified data processing system, wherein less equipment is available.

The present invention offers to effect the exchange without using such registers. With that purpose, it calls upon "exclusive OR" operators or circuits. These operators make a "sum modulo 2" of two operands $x$ and $y$ stored respectively in two bistable registers. The result of the operation is transferred into one of these registers and thus substitutes itself for one of the operands, the condition of the other register remaining unchanged.

One of the features of the present invention is a device of exchange of information between two bistable registers comprising mainly two operators of the type "exclusive OR." The arrangement is such that, in a first stage, the first operator makes the "sum modulo 2" of the operands stored in the two registers so as to transfer the result of the operation into one of them. In a second stage, the second operator repeats the same operation so as to transfer the result into the other register. In a third and last stage the first operator still repeats the same operation in order to transfer the result into the first register, some terms cancelling each other during these successive transformations, so that the operand initially present in the first register will be found in the second register, and vice versa.

Another feature of the present invention is to read a memory cell by storing its contents in the memory register, proceed with the exchange of operands stored in the memory register and the accumulator register, and transfer the contents of the memory register into the memory cell (inscription). This enables an exchange of information between the memory cell and the accumulator register.

Another feature of the present invention is to transfer the result of the first operation "sum modulo 2" into the accumulator register, the result of the second operation into the memory reigster and the result of the third operation into the accumulator register.

Another feature of the present invention is to assign a time position to the reading of the memory cell as well as to each one of the three operations "sum modulo 2," the storing into the memory cell being realized at the same time as the last "sum modulo 2," which, thus, makes it possible to save one time position.

Different other features of the invention will become apparent from the description that follows, given by way of non-limiting example, in conjunction with the accompanying drawings in which:

FIGURE 3, represents a tabulation of the sequence of the elementary operations relating to the "exchange" instruction;

The generic term "bistable circuit" is used herein to designate any electronic circuit liable to occupy two stable positions; the binary counters, in particular, are included in this designation.

Figure 1:
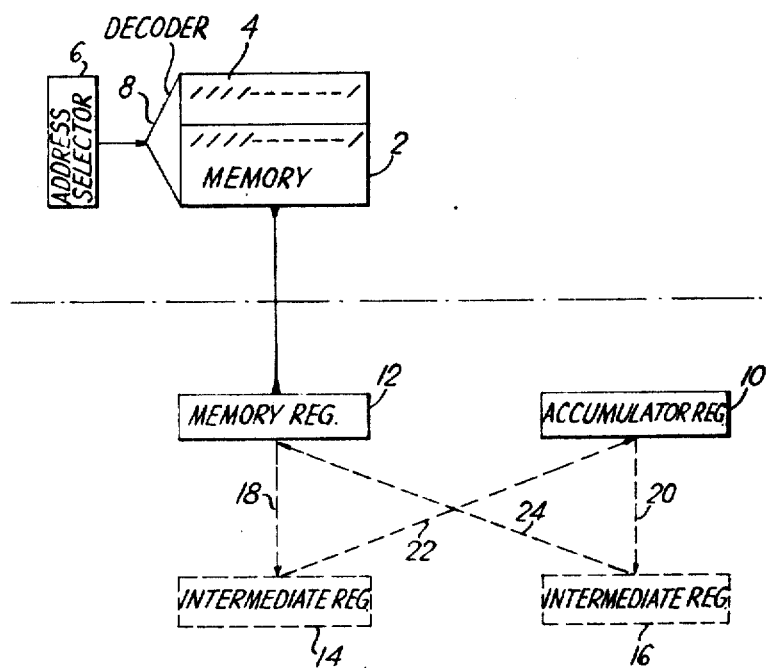
FIGURE 1 is a block diagram showing the process of exchange of informaiton utilizing two intermediary registers.
Figure 2:
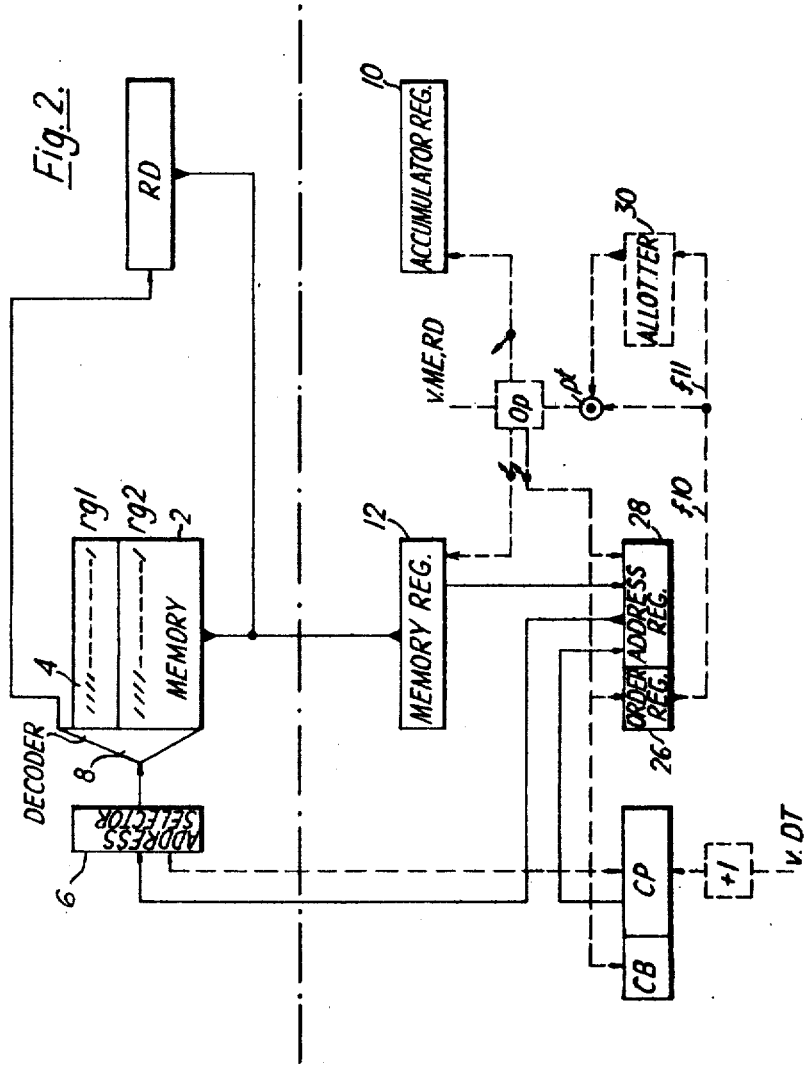
FIGURE 2, is a block diagram of the data processing system of the present invention.

*Performing the "exchange" instruction.*—One of the operands, to be designated by $x$ is supposed to be stored in the accumulator register 10 of FIG. 2. The instruction which gives the address of the second operand $y$ and the order "exchange," has been called and is stored in the order register 26 and address register 28.

Figure 8:
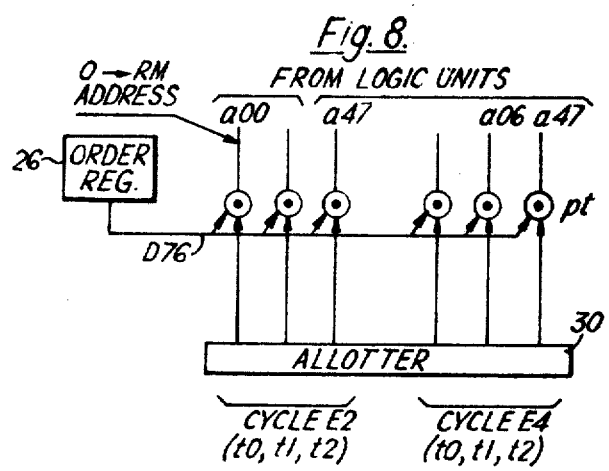
FIGURE 8, represents a detail of the diagram in FIGURE 2 showing the successive setting into service of the various operators under control of the alloter.

The order is decoded by any adequate means, which originates a signal along the one wire D76, of FIG. 8 that characterizes this order; thus is prepared the unlocking of gates $pt$ and the setting into service of operators necessary for the execution of the instruction. The beginning of the cycle E2 shown in FIG. 3, corresponds to the call of the second operand $y$ and of the first of the two exectution cycles of the instruction. The first line in the table of FIGURE 3 indicates the operations common to all the instructions liable to be performed by the machine; the second line (ECH) indicates the operations particular to the "exchange" instruction.

At the instant $t0$ of cycle E2, FIGURES 3 and 8, the alloter 30 unlocks the first one of gates $pt$, counting from the left, and thus causes the sending of a control signal along wire $a00$. This signal acts upon two operators; the first one commands the restoring to zero of all the bistables of the memory register 12, the second one ensures the transfer of contents of the address register 28 into the address selector 6 of FIG. 2. Due to this, the decoder 8 is connected to the memory cell containing the operand $y$. The various operations necessary for the functioning of the system, even the simplest ones such as restoring to zero, transfer of information between registers, etc. are all accomplished by operators. Each bistable register is permanently connected to all the operators it might be in need of; these operators are normally inactive and only operate under control of the alloter 30 and of the order register 26 of the inscription register. As is indicated in FIG. 8, the alloter 30 counts cycles (E2, E4) and elementary time positions ($t0$, $t1$, $t2$) inside every cycle.

At the instant $t1$ of cycle E2, the alloter 30 unlocks the second gate $pt$, sending thus a signal along control wire *lect*. Due to this, the reading is started of operand $y$ designated by the address selector 6; in other words, this operand is transferred from memory 2 into memory register 12. This transfer is performed by an operator started by the signal emitted along wire *lect*.

Figure 4:
FIGURES 4 to 7, illustrate the successive conditions of the memory register and of the accumulator register during the exchange.
Figure 5:
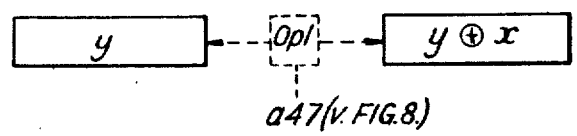
Figure 6:
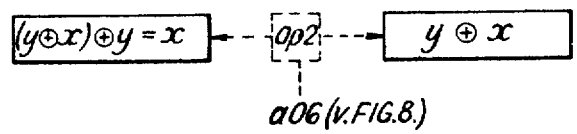
Figure 7:
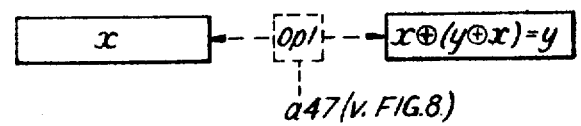

The two operands $x$ and $y$ are now stored in the accumulator register 10 and the memory register 12 respectively, as shown in FIG. 4. The performing of exchange of information between these two registers makes intervene operators of the type "exclusive OR." The "exclusive OR" operator makes a simple addition of two binary numbers but without taking any account of the carries, this operation being also so-called "sum modulo 2." The operator makes the "sum modulo 2" of the numbers stored in the memory register 12 and the accumulator register 10, the result being hten stored in this latter register and therefore substituting itself for one of the two operands. It is obvious that in a similar way it its possible to realize an "exclusive OR" operator storing the result into memory register 12. Further on in the operation of the system, the following two types of operators will be used. The designation $op1$ will be applied to the operator which stores the result in accumulator register 10, and $op2$ to the operator which stores the result in memory register 12. This is shown in FIGS. 5 to 7. The sign indicating the operation "sum modulo 2" is made up of a cross surrounded by a small circle ($\oplus$).

In order to follow the operating process of the invention, FIGURES 3 to 8 are to be referred to. At the instant $t2$ of cycle E2, the alloter 30 unlocks the third gate $pt$, therefore originating a control signal along wire $a47$; thus, one acts upon the operator $op1$ which makes the "sum modulo 2" of operands $y$ and $x$ so as to store the result in the accumulator register 10. The operand $y$ remains stored, without any change, in the memory register 12. The situation of the two registers 10 and 12 is the one indicated in FIGURE 5.

As can be seen in FIGURE 3, the cycle E3 is not used in case of an exchange of information, same as time position $t0$ of cycle E4.

At the instant $t1$ of cycle E4, the alloter 30 unlocks the fifth door $pt$, originating thus a control signal along wire $a06$ connected to operator $op2$. The latter operates and makes "sum modulo 2" of the binary numbers stored in registers 10 and 12, so as to transfer the result into memory register 12. Thus is obtained, in this latter register, the following:

$$(y \oplus x) \oplus y = x$$

Indeed when the "sum modulo 2" is made of two identical numbers, 0 is always obtained; the two terms $y$ cancel each other and there remains $x$ only. The number stored in the accumulator register 10, that is $y \oplus x$, remains unchanged. The two registers 10 and 12 are then in the situation indicated in FIGURE 6.

At the instant $t2$ of cycle E4, the alloter 30 unlocks the sixth gate $pt$, originating thus a control signal along wire $a47$ and causing once more the functioning of the operator $op1$. This latter makes the "sum modulo 2" of the numbers stored in registers 10 and 12 and transfers the result into the register 10. Thus is obtained, in this latter register, the following:

$$x \oplus (y \oplus x) = y$$

The number $x$ previously stored in the register 12 remains unchanged. The two registers 10 and 12 happen to be then in the situation indicated in FIGURE 7.

The exchange of information between registers 10 and 12 is now realized; the operand $x$, initially stored in 10, is transferred into 12; the operand $y$, previously stored in 12, is transferred into 10, without having had to utilize intermediary registers.

There now only remains to store in the memory cell the contents of register 12, that is $x$. This storing operation is accomplished at the instant $t2$ of cycle E4, while the operator $op1$ makes the last "sum modulo 2" in order to reach the result indicated in FIGURE 7. As in all the transfers of information, this storing operation is performed by means of an appropriate operator started, in the example described, by the control signal emitted along wire $a47$. Therefore the exchange has indeed been realized between the contents of the memory cell ($y$) and contents of the accumulator register ($x$); and this having been performed in two cycles only.

Figure 9A:
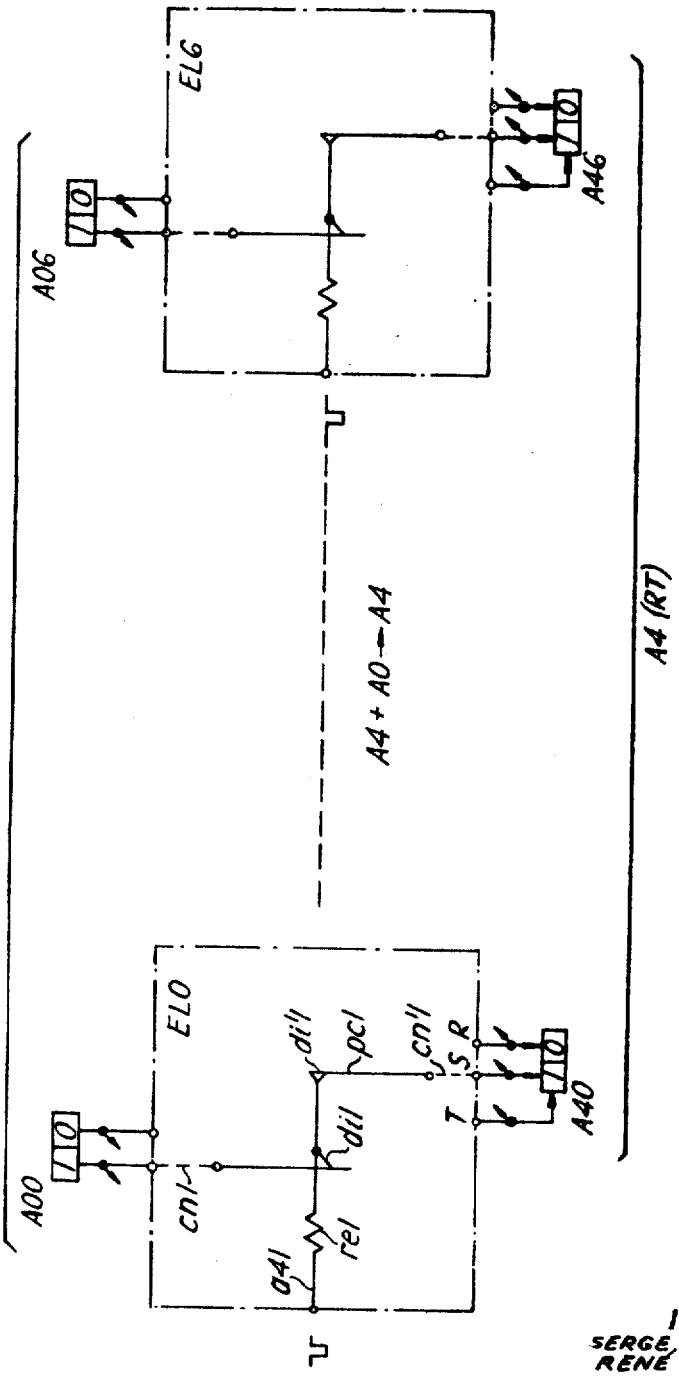
FIGURE 9A is a diagram of the arrangement to perform the "inclusive OR" function.

The following is intended to review the well known principles of Exclusive OR operation with particular reference to FIGS. 9 and 10. Upon application of two binary bits to an Exclusive OR circuit it is known that the resultant will yield an "0" if both input operands are indentical and to yield a "1" if the two inputs are different. This operation, which amounts to adding two binary numbers and neglecting the carries, is moreover known under the name of "sum modulo two."

Figure 11:
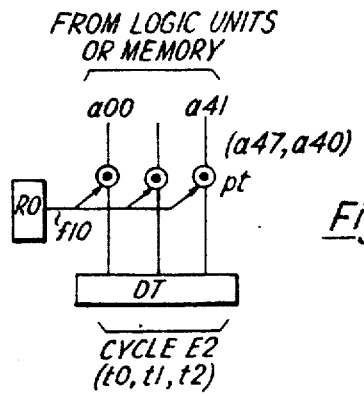
FIGURE 11 is a detail of the control showing the successive setting into service of the various operators under control of the time alloter.

In executing the instruction "Exclusive OR" the register RO of FIG. 11, having received this instruction, prepares the unlocking of another group of gates $pt$ as well as the sending of a signal along wire *a*47 in order to make the corresponding operator function.

The two operands *x* and *y* are supposed to be made up each of a character of 7 bits. The operand *x* is stored in the bistables A40 . . . A46 of register A4, FIG. 9A; the operand *y* is stored in the bistables A00 . . . A06 of the register A0. The "inclusive OR" operator is made up of elements EL0 . . . EL6 shown inside chain-dotted rectangles. Each one of these elements contains a resistor *re*1, two diodes *di*1, *di'*1 and two connections shown in dotted line, *cn*1, *cn'*1. The two registers A4 and A0 are connected in permanence to the operator, that is without the help of any contact, but this operator remains normally inactive. The arrows show that these registers are also multipled upon all the other operators with which they are liable to operate.

In all the description that follows, the bistables A00 . . . A06 will be designated by the name of "emitting bistables"; the bistables A40 . . . A46 will be designated by "receiving bistables." The bistables A00 . . . A06 are so-called "emitting" not because they act directly upon the receiving bistables, but because they condition the flowing of a control impulse which sets into place the receiving impulses.

When a control signal is sent along incoming wire or supply wire *a*41, in the form of a negative impulse, this signal flows through resistor *re*1 and reaches conductor *pc*1, unless it is short-circuited by the earth originating from outlet 1 of the bistable A00. It is then possible to consider two cases of operation.

If the bistable A00 is in position 0, its outlet 1 is earthed and the control impulse cannot reach conductor *pc*1. Under such conditions the receiving bistable A40 remains in the position considered here, that is to say in 0 if previously it was in 0; and in position 1 if previously it was in 1. This result can be brought inside a table such as the one of FIGURE 10A. In the first vertical line, the initial positions of the emitting bistable A00 have been written; and in the first horizontal line the initial positions of the receiving bistable A40 have been written. The digit written at each intersection of horizontal column and vertical column indicates the final position occupied by the receiving bistable A40. In the case considered here, the bistable A00 is in 0 and the bistable A40 remains in its precedingly occupied position; one is therefore led to write on the second horizontal line, opposite the indication (A00, 0) the digits 0 and 1.

If the emitting bistable A00 is in 1, its outlet 1 happens to be a −12 v. potential and the control impulse reaches conductor *pc*1. Due to this fact, the receiving bistable A40 will itself pass into 1. On the third horizontal line of table in FIGURE 10A, opposite the indication (A00, 1), the two digits 1, 1, are therefore written.

Figure 10A:
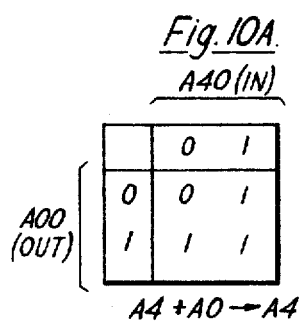
FIGURE 10A is a table to illustrate the bistable conditions resulting from the "Inclusive OR" operation.

From a study of FIGURE 10A it is seen that the final description of the receiving bistable A40 is a 1 when at least one of the two bits stored initially in A00 and A40, is a 1; and it is a 0 when these two bits are themselves 0's. So an operation "inclusive OR" has therefore been performed and the result has been stored in A40.

The operating process is the same for the other bistable couples, and in particular for the bistables A06, A46.

In the special case where all the bistables A40 . . . A46 are initially in 0, it is evident that the character stored in emitting register A0 happens simply to be recopied on receiving register A4 when the control impulse is received; the register A4 is somehow "loaded" with contents of register A0. It is for this reason that the operator was so-called by the term "loading" operator.

Figure 9B:
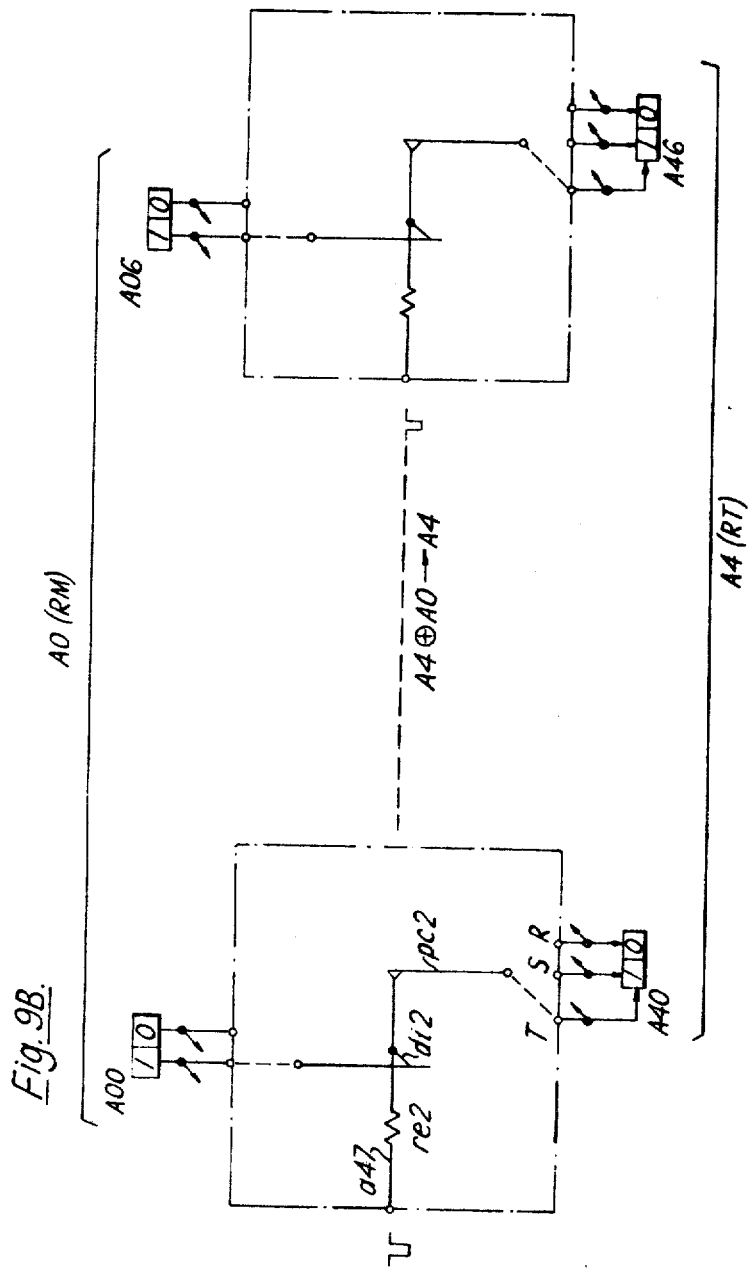
FIGURE 9B is a diagram of the circuit to perform the "exclusive OR" function.

In FIGURE 9B, the diagram is shown of the loading operator which enables to perform the "exclusive OR" instruction. This diagram only differs from the one in FIGURE 3 by the connection that links conductor *pc*2 to the receiving bistable A40; in the case considered here, this connection is linked to inlet T of this bistable.

Figure 10B:
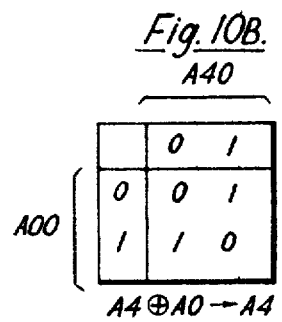
FIGURE 10B is a table illustrating the Exclusive OR operation.

If the emitting bistable A00 is in "0," the control impulse received upon wire *a*47 is short-circuited and the receiving bistable A40 remains in its previously occupied position. In the table of FIGURE 10B the digits "0" and "1" are written opposite the indication (A00, 0).

If the emitting bistable A00 is in "1," the control impulse received upon wire *a*47 reaches conductor *pc*2 and from there flows to inlet T of the receiving bistable T. Thus, position of the latter is reversed; it passes onto "1" if it was in "0," and onto "0" if it was in "1." In the table of FIGURE 10B, the digits 1 and 0 are written opposite the indication (A00, 1), that is to say, the reverse digits of those in the first horizontal line.

From a study of FIGURE 10B it is seen that the final position of the receiving bistable A40 is "0," when both bits initially stored in A40 and A00 are identical; and it is "1" when these two bits are different. So, an "exclusive OR" operation or "sum modulo two" has therefore been performed and the result stored in A40.

The mode of illustrating is the same as for the "inclusive OR" operator, it will only be noted that the incoming of the control signal is made on wire *a*47 and that the inlet T of the receiving bistable is used.

In the foregoing description, it has been assumed—with the purpose of simplifying the explanations—that the various elements of each one of the two registers, namely A00 . . . A06, A40 . . . A46, were made up of binary counters, that is to say, bistable circuits which change position when a signal is sent to them upon inlet T. In fact, this possibility is only used for the loading operator, second alternative, that is to say, the one which performs the "exclusive OR" instruction. In the other cases, a simple bistable having no inlet T will do.

In the operators previously described, an element such as EL0 (FIG. 9A), is associated with only one emitting bistable A00 and one receiving bistable A40. This arrangement can be generalized in the following way: each operator element EL0, while acting upon only one receiving bistable A40, can be associated with all or part of the emitting bistables A00 . . . A06. By providing an appropriate network of diodes and by arranging in adequate way the connections such as *cn*1, it is possible to make it so that a signal appears on the conductor *pc*1 only when certain conditions depending upon the emitting bistables A00 . . . A46 are realized; this signal can act then on the receiving bistable A40 either through inlet S, or through inlet R, or, through inlet T. The final position of the bistable A40 is evidently depending upon the position of the emitting bistables A00 . . . A06, but, in some circumstances, it is also dependent of the position it occupied beforehand. Indeed, when the control impulse cannot reach conductor *pc*1, this bistable remains in the same position as before; when the control impulse reaches conductor *pc*1 and that inlet T is used, this bistable changes position systematically. In a general way, it is therefore possible to realize systems in which one operand is stored in the bistables A00 . . . A06 and the other operand in the bistables A40 . . . A46; the result of the operation being finally written in the registers A40 . . . A46 and thus substituting itself for one of the operands.

It is understood the foregoing descriptions have been given only as a way of non limiting example, and that many other embodiments are liable to be carried out without leaving the scope of the present invention. In particular, one may replace the components, or group of components, by elements fulfilling the same functions; adopt a different time diagram; provide for storing the logic operation results inside the ferrite core memory; and, operate on characters comprising a whatever number of bits.

What is claimed is:

1. A circuit for interchanging binary coded information comprising at least two storage registers an Exclusive OR circuit, gate means and control means interconnecting the Exclusive OR circuit, gate means and storage registers for gating and directing binary information, the Exclusive OR circuit being responsive to the contents of a first and a second storage register, to generate a sum modulo 2, the resultant sum modulo 2 being stored in the second register and the first register retaining its original information, the Exclusive OR circuit upon a second gating being responsive to the original contents of the first and new contents of the second register and arranged so the second resultant is gated to the first register and the Exclusive OR circuit upon being gated again produces an Exclusive OR resultant from the contents of the first and second registers so as to provide a third resultant which is stored in the second register whereby, due to dropout terms from the three Exclusive OR operations, the original bistable information has been interchanged between the two registers.

2. A circuit responsive to gated control signals for interchanging information between at least two storage registers comprising a first Exclusive OR circuit responsive to the contents of first and second storage registers, the resultant sum modulo 2 being stored in the second register and the first register retaining its original information, a second Exclusive OR circuit responsive to the original contents of the first and new contents of the second register and arranged so the resultant is gated to the first register, and the first Exclusive OR circuit being gated again to produce an Exclusive OR resultant from the contents of the first and second registers so as to provide a third resultant which is stored in the second register whereby, due to dropout terms from the three Exclusive OR operations, the original information has been interchanged between the two registers.

3. A circuit for interchanging binary coded information between at least two storage registers, comprising control signals for operating gates to transfer binary coded data, an Exclusive OR circuit for generating a sum modulo 2 responsive to the contents of first and second storage registers, the resultant sum modulo 2 being stored in the second register and the first register retaining its original information, a second Exclusive OR circuit responsive to the original contents of the first and new contents of the second register and arranged so the resultant is gated to the first register, the circuit being gated again by the control signals to produce an Exclusive OR resultant from the contents of the first and second registers so as to provide a third resultant which is stored in the second register whereby, due to dropout terms from the three Exclusive OR operations, the original binary information has been interchanged between the two registers.

References Cited

UNITED STATES PATENTS

| | | | |
|---|---|---|---|
| 3,331,954 | 8/1967 | Kinzie et al. | 235—156 |
| 3,314,015 | 4/1967 | Simone | 328—165 |
| 3,209,332 | 9/1965 | Doersam | 340—172.5 |
| 3,202,805 | 8/1965 | Amdahl et al. | 235—164 |
| 3,201,759 | 8/1965 | Kelly | 340—172.5 |
| 3,200,379 | 8/1965 | King et al. | 340—172.5 |
| 3,197,738 | 7/1965 | Raser et al. | 340—172.5 |
| 3,161,763 | 12/1964 | Glaser | 235—157 |

ROBERT C. BAILEY, *Primary Examiner.*

GARETH D. SHAW, *Assistant Examiner.*